(12) United States Patent
Kang et al.

(10) Patent No.: US 8,493,333 B2
(45) Date of Patent: Jul. 23, 2013

(54) METHOD OF DISPLAYING INFORMATION BY USING TOUCH INPUT IN MOBILE TERMINAL

(75) Inventors: Tae Young Kang, Uijeongbu-si (KR); Nho Kyung Hong, Seoul (KR); Yong Ho Choi, Seoul (KR); Hui Chul Yang, Seoul (KR); In Won Jong, Seoul (KR); Min Kyung Lee, Seoul (KR); Wan Soo Lim, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1158 days.

(21) Appl. No.: 11/972,141

(22) Filed: Jan. 10, 2008

(65) Prior Publication Data
US 2008/0192020 A1 Aug. 14, 2008

(30) Foreign Application Priority Data
Feb. 12, 2007 (KR) .................. 10-2007-0014409

(51) Int. Cl.
*G06F 3/041* (2006.01)
(52) U.S. Cl.
USPC .............. 345/173; 178/18.01; 178/19.07; 715/863
(58) Field of Classification Search
USPC ............. 178/18.01–18.11; 345/173–178; 715/700–866
See application file for complete search history.

(56) References Cited

U.S. PATENT DOCUMENTS

| 2002/0122029 A1* | 9/2002 | Murphy .................. 345/173 |
| 2004/0090423 A1* | 5/2004 | Bisset .................... 345/169 |
| 2006/0029381 A1* | 2/2006 | Onozawa ................. 396/147 |
| 2006/0036955 A1 | 2/2006 | Baudisch et al. |
| 2008/0178126 A1* | 7/2008 | Beeck et al. .............. 715/863 |

FOREIGN PATENT DOCUMENTS

| CN | 1755595 A | 4/2006 |
| JP | 10-283115 A | 10/1998 |
| KR | 100686562 B1 | 2/2007 |

OTHER PUBLICATIONS

Bausisch et al., Collapse-to-Zoom: Viewing Web Pages on Small Screen Devices by Interactively Removing Irrelevant Content, XP-002460987, vol. 6, Issue 2, Oct. 24, 2004.

* cited by examiner

*Primary Examiner* — Michael Pervan
(74) *Attorney, Agent, or Firm* — Jefferson IP Law, LLP

(57) ABSTRACT

A method of displaying information in a mobile terminal having a touch screen is provided. The method includes determining whether a touch input is generated by a touch screen, determining whether a touch area moves, calculating a movement direction of the touch area by extracting a value of the touch area movement, determining a current mode according to the calculated movement direction of the touch area, executing a function of the current mode corresponding to the extracted value of the touch area movement, and displaying, while executing the function of the current mode, at least one of a displacement value generated by executing the function of the current mode and a current mode icon indicating the current mode. Accordingly, when displaying information according to a touch input, changes of information may be displayed distinctively, and thereby user convenience may be improved.

12 Claims, 8 Drawing Sheets

METHOD OF DISPLAYING INFORMATION BY USING TOUCH INPUT IN MOBILE TERMINAL

PRIORITY

This application claims the benefit under 35 U.S.C. §119(a) of a Korean patent application filed in the Korean Intellectual Property Office on Feb. 12, 2007 and assigned Serial No. 2007-0014409, the entire disclosure of which is hereby incorporated by reference.

BACKGROUND OF THE INVENTION

1. Field of the Invention

The present invention relates to a method of displaying information in a mobile terminal having a touch screen. More particularly, the present invention relates to a method of determining a current mode corresponding to a touch input and displaying at least one of a displacement value indicating movement of a touch area and a mode icon indicating the current mode distinctively.

2. Description of the Related Art

With developments of information and telecommunication technology and of semiconductor technology, various mobile terminals have become popular. Recent mobile terminals provide various functions, such as multimedia, wireless Internet, short-range radio communication and mobile broadcast functions, in addition to their basic functions of voice communication and character message transmission. More particularly, the size, design, display resolution and user interface of the mobile terminals are being improved.

According to this trend, methods for applying a touch screen to the mobile terminals are being developed. The touch screen enables both input and display operations to be performed in a single display unit. Because the touch screen can replace the function of a keypad, the size of the touch screen may be increased, and thereby a user may operate the mobile terminals more conveniently. Therefore, research and development of touch screens is very active. However, there remain many areas to be improved for user convenience in using the touch screen.

SUMMARY OF THE INVENTION

An aspect of the present invention is to address the above-mentioned problems and/or disadvantages and to provide at least the advantages described below. Accordingly, an aspect of the present invention is to provide a method of displaying information corresponding to a touch input with improved user convenience in a mobile terminal having a touch screen.

Another aspect of the present invention is to provide a method of displaying changes of information generated by a touch input distinctively in a mobile terminal having a touch screen.

In accordance with an aspect of the present invention, a method of displaying information in a mobile terminal is provided. The method includes determining whether a touch input is generated by a touch screen, determining, if the touch input is generated by the touch screen, whether a touch area moves, calculating, if the touch area moves, a movement direction of the touch area by extracting a value of the touch area movement, determining a current mode according to the calculated movement direction of the touch area, executing a function of the current mode corresponding to the extracted value of the touch area movement, and displaying, while executing the function of the current mode, at least one of a displacement value calculated by executing a function of the current mode and a current mode icon indicating the current mode.

In accordance with an aspect of the present invention, a method of displaying information in a mobile terminal is provided. In the method of displaying information in a mobile terminal, the current mode may be set to a first mode if the calculated movement direction is a vertical direction and to a second mode if the calculated movement direction is a horizontal direction. The displacement value may be displayed in a numeral form or in a bar form. The bar form is preferably disposed corresponding to the movement direction. The displaying of at least one of a displacement value and a current mode icon may include extracting an outermost coordinate from the coordinates of the touch area, and displaying the current mode icon maintaining a distance from the extracted outermost coordinate. The displaying of the at least one of the displacement value and the current mode icon may further include displaying the displacement value in a numeral form beside the current mode icon. The outermost coordinate may be at least one of the uppermost coordinate, the leftmost coordinate, and the rightmost coordinate of the touch area.

In accordance with an aspect of the present invention, a method of displaying information in a mobile terminal is provided. The method of displaying information in the mobile terminal may include displaying, before determining whether a touch input is generated, mode indication icons of individual movement directions. The mode indication icons preferably disappear when a displacement value is displayed. The method of displaying information in the mobile terminal may further include determining, after displaying at least one of the displacement value generated by executing the function of the current mode and a current mode icon indicating the current mode, whether the touch input generated by the touch screen is discontinued, and erasing, if the touch input generated by the touch screen is discontinued, the current mode icon.

In accordance with an aspect of the present invention, a method of displaying information in a mobile terminal is provided. The method of displaying information in the mobile terminal includes determining whether a mode is selected from a touch screen, setting, if a mode is selected from a touch screen, the selected mode as the current mode, and determining, if a mode is selected from a touch screen, whether a touch input is generated by the touch screen, extracting, if a touch input is generated by the touch screen, an outermost coordinate from the coordinates of the touch area, and displaying a current mode icon maintaining a distance from the extracted outermost coordinate.

In accordance with an aspect of the present invention, a method of displaying information in a mobile terminal is provided. The method of displaying information in the mobile terminal may include determining, after displaying a current mode icon, whether the touch area moves, extracting, if the touch area moves, the coordinates of the touch area, and executing a function of the current mode corresponding to the extracted coordinates of the touch area.

In accordance with an aspect of the present invention, a method of displaying information in a mobile terminal is provided. The method may include displaying a displacement value generated by executing a function of the current mode. The displacement value may be displayed in a numeral form or in a bar form. The displaying of the current mode icon may include displaying, adjacent to the current mode icon, a displacement value generated by executing a function of the current mode. The outermost coordinate is preferably at least one of the uppermost coordinate, the leftmost coordinate and the rightmost coordinate of the touch area. The determining of whether a mode is selected may include displaying a plurality of mode indication icons, and identifying whether a mode indication icon is selected from the displayed mode indication icons.

In accordance with an aspect of the present invention, a method of displaying information in a mobile terminal is provided. The method may include determining, after displaying a current mode icon, whether the touch input generated by the touch screen is discontinued, and erasing, if the touch input generated by the touch screen is discontinued from, the current mode icon.

BRIEF DESCRIPTION OF THE DRAWINGS

The above and other aspects, features and advantages of certain exemplary embodiments of the present invention will become more apparent from the following detailed description in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1A:
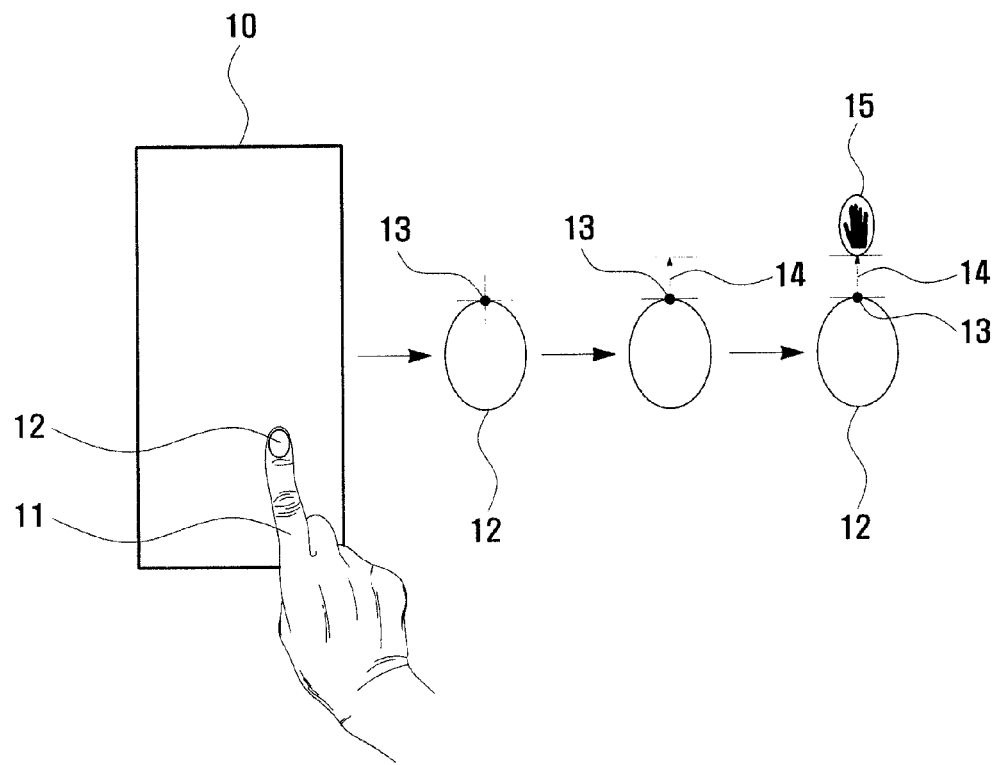
FIGS. 1A to 1C are diagrams illustrating examples of moving a finger on a touch screen in a method of displaying information in a mobile terminal according to an exemplary embodiment of the present invention.
Figure 1B:
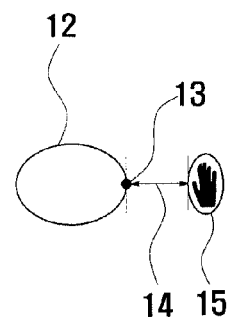
Figure 1C:
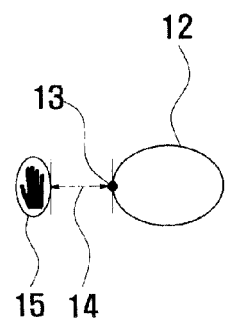

FIGS. 1A to 1C are diagrams illustrating examples of moving a finger on a touch screen according to an exemplary embodiment of the present invention.

As shown in FIG. 1A, if a finger 11 touches a touch screen 10, the touch screen 10 detects a touch area 12. The touch area 12 is a specific area of the touch screen 10 in which a touch input is generated by a user operation. The coordinates of the touch area 12 expressed in pixel units are transmitted to a control unit of a mobile terminal, and the control unit extracts an uppermost coordinate 13 of the touch area 12. The control unit controls to display a current mode icon 15 above the touch area 12 that maintains a distance 14 from the uppermost coordinate 13. The distance 14 may be set in pixel units.

The current mode icon 15 maintains the distance from the touch area 12 because the touch area 12 may be obscured by the finger 11 or by an input device. The current mode icon 15 is not limited to being displayed at the upper side of the touch area 12, and can alternatively be displayed at the right and left side of the touch area 12, as shown in FIGS. 1B and 1C respectively.

If the touch area 12 moves (i.e. if a user drags the finger 11 on the touch screen 10 in a state of touching the touch screen 10), the current mode icon 15 is displayed continuously following the movement of the touch area 12. However, if the touch area 12 is deactivated (i.e. if the finger 11 is released from the touch screen 10), the current mode icon 15 disappears from the touch screen 10.

The current mode icon 15 indicates a mode currently in execution. For example, the mode may be a state of a function executed by the mobile terminal, such as a panning mode, a zoom in/out mode, and a brightness control mode of a camera function. The mode may vary according to a type of mobile terminal or a type of application.

A plurality of modes may be displayed in the touch screen, and a mode may be selected from the displayed modes by either of the following two methods. In a first mode selection method, mode indication icons for indicating individual modes are displayed on the touch screen, and a user may select at least one of the displayed mode indication icons. The selectable mode indication icons are different from the current mode icon 15 in that all selectable mode indication icons are displayed in a specific area (for example, at the left side) of the touch screen 10. This method will be described later in greater detail. In a second mode selection method, different modes are assigned to each possible movement direction of the finger, and a mode is automatically selected according to the movement direction of the finger.

According to the mode selection method, the current mode icon 15 is displayed on the touch screen 10 at different timings related to the selection of a mode. In the first mode selection method, after selection of a mode indication icon, the current mode icon 15 is displayed immediately when a touch input is generated on the touch screen 10, because the current mode is already determined according to the selected mode indication icon regardless of the movement direction of the touch area 12. However, in the second mode selection method, the current mode is determined and the current mode icon 15 is displayed only when the touch area 12 moves after generating a touch input, because the selected current mode is determined according to the movement direction of the touch area 12.

Figure 2A:
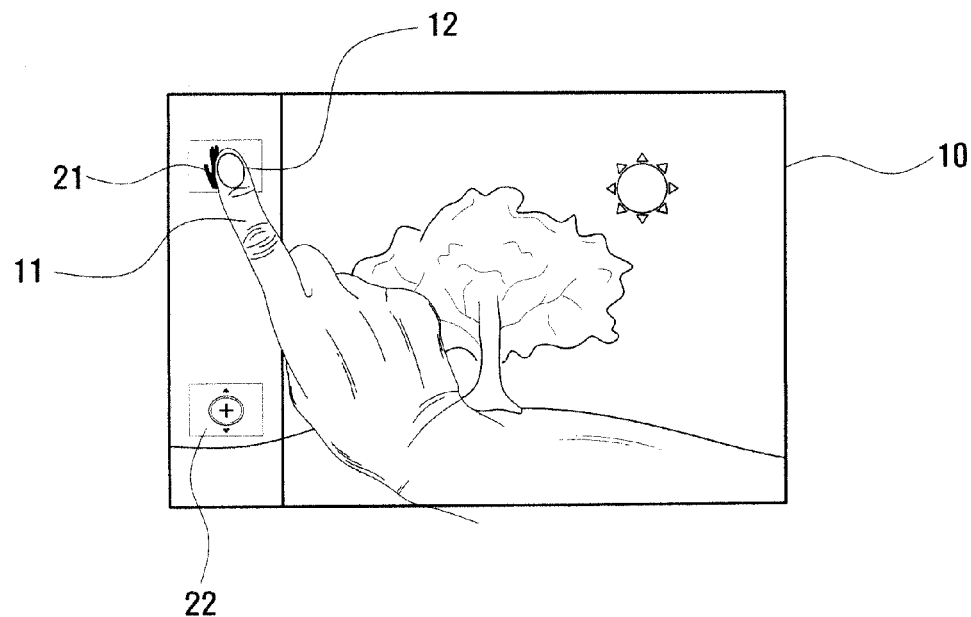
FIGS. 2A and 2B are display screens illustrating a method of displaying information according to an exemplary embodiment of the present invention.
Figure 2B:
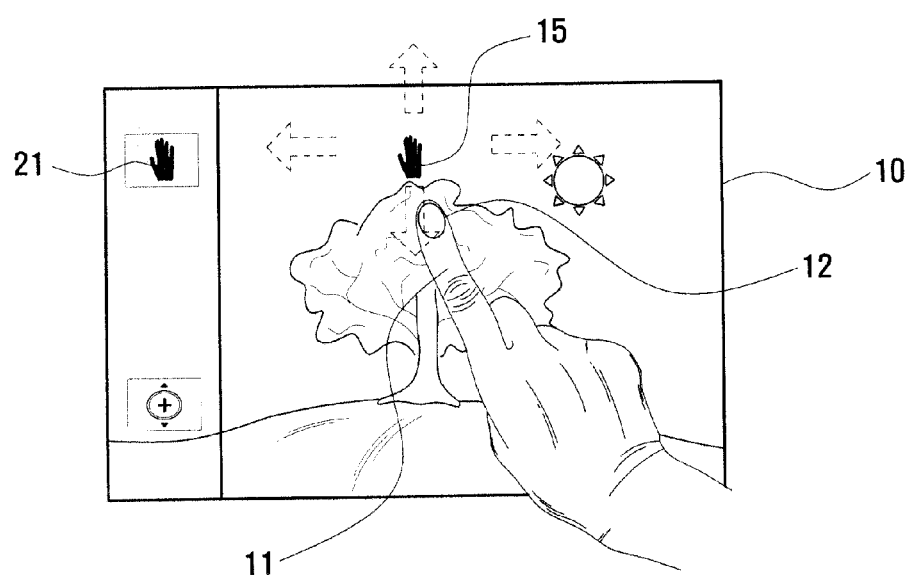

FIGS. 2A and 2B are display screens illustrating a method of displaying information according to an exemplary embodiment of the present invention. This exemplary embodiment corresponds to the first mode selection method.

Referring to FIG. 2A, mode indication icons (for example, a panning mode icon 21 and a zoom mode icon 22) are displayed at the left side of the touch screen 10, and entered by selection of the corresponding mode indication icon by the user. For example, if the panning mode icon 21 is selected as shown in FIG. 2A, the mobile terminal enters a panning mode. At this moment, the mode indication icon selected by the user disappears from the touch screen 10.

When the user again touches the touch screen 10, the selected mode indication icon reappears at the side of the touch screen 10, and the current mode icon 15 indicating a panning mode is displayed, as shown in FIG. 2B. Operations of detecting a touch input, extracting an uppermost coordinate of the touch area 12, and displaying a current mode icon 15 maintaining a distance from the touch area 12 are performed as previously described in relation to FIGS. 1A to 1C. In the panning mode, the user may drag the finger 11 to move the touch area 12 displayed on the touch screen 10 in a desired direction. The current mode icon 15 is continuously displayed above the touch area 12 following the movement of the touch area 12. As the location of the touch area 12 changes, the mobile terminal repeats the operations of detecting a touch input and extracting an uppermost coordinate of the touch area 12, and the location of the current mode icon 15 changes accordingly. Technology for moving an image displayed on a touch screen corresponding to movement of a touch area is well known in the art, and thereby is omitted here.

If the user selects a zoom mode icon 22, the mobile terminal enters a zoom in/out mode. Subsequently, if the user touches the touch screen 10, a zoom mode icon (not shown) is displayed above the touch area 12, and if the user drags a finger while in the zoom in/out mode, an image displayed on the touch screen 10 is enlarged or reduced. The extent of enlargement or reduction is determined by a displacement value of the touch area 12 (e.g. a distance and a direction of finger movement). The extent of enlargement or reduction may be displayed in a numeral form. With the movement of the touch area 12, the location of the current mode icon 15 changes accordingly.

FIGS. 3A to 3D are display screens illustrating a method of displaying information according to an exemplary embodiment of the present invention. This exemplary embodiment corresponds to the second mode selection method.

Figure 3A:
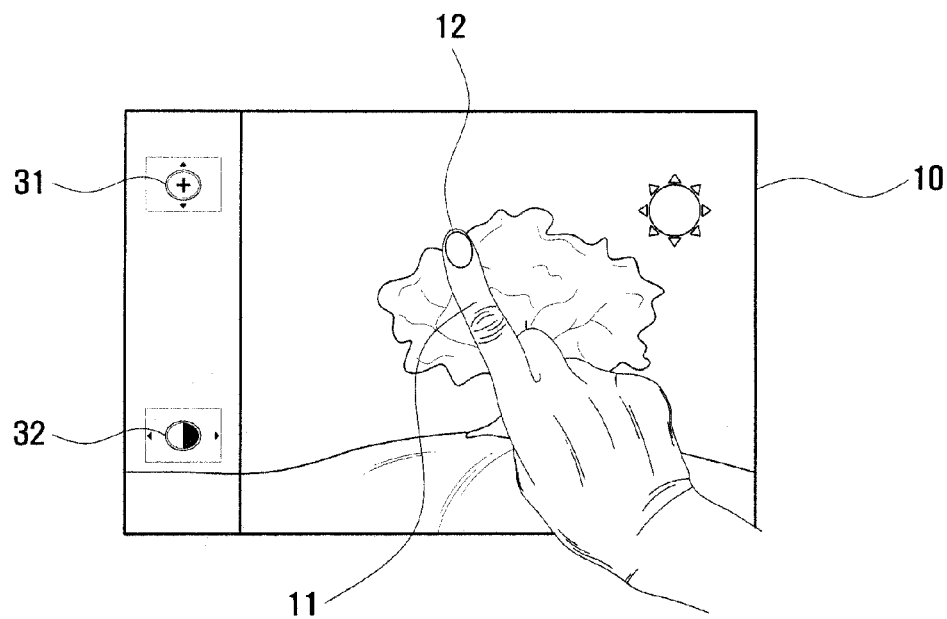
FIGS. 3A to 3D are display screens illustrating a method of displaying information according to an exemplary embodiment of the present invention.

Referring to FIG. 3A, mode indication icons (for example, a zoom mode icon 31 and a brightness control mode icon 32) are displayed at the left side of the touch screen 10. In contrast to the mode indication icons 21 and 22 in the exemplary embodiment of FIGS. 2A and 2B, the mode indication icons 31 and 32 are not provided for a user selection, and simply indicate which mode is selected when the touch area 12 moves in a specific direction. In the example, the zoom mode icon 31 is assigned to the vertical direction and the brightness control mode icon 32 is assigned to the horizontal direction. If a touch input is generated, the current mode icon 15 is not displayed on the touch screen 10. The current mode icon 15 appears only when the touch area 12 starts to move in any direction.

Figure 3B:
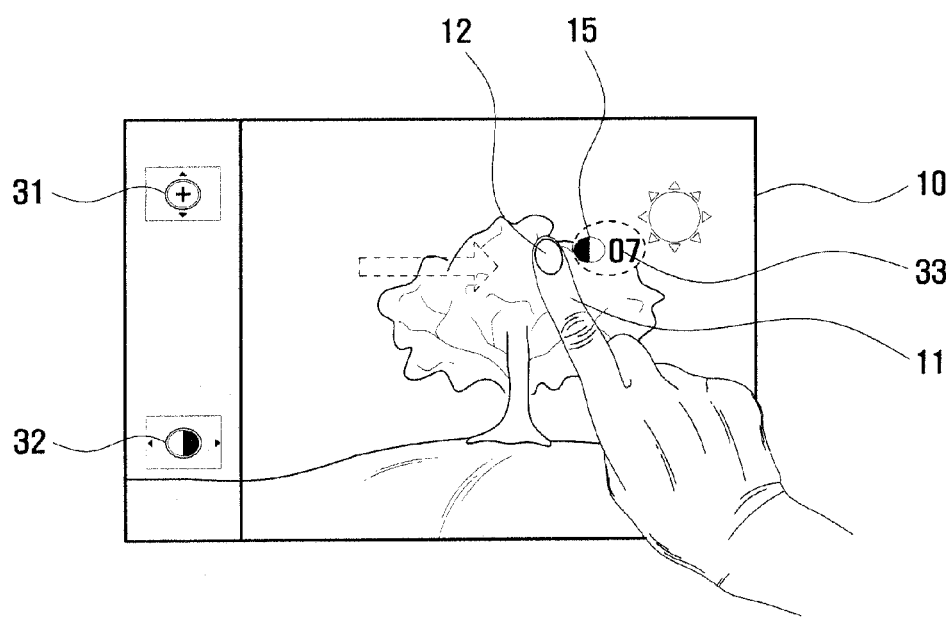

If the user touches the touch screen 10 and drags the finger 11 as shown in FIG. 3B, the current mode icon 15 indicating a brightness control mode is displayed at the right side of the touch area 12. Additionally, a displacement value 33 indicating the extent of a brightness control is displayed beside the current mode icon 15. In the brightness control mode, a display location of the current mode icon 15 may vary according to the movement direction of the touch area 12. For example, the current mode icon 15 is displayed at the right side of the touch area 12 when the touch area 12 moves rightwards, and the current mode icon 15 is displayed at the left side of the touch area 12 when the touch area 12 moves leftwards.

Figure 3C:
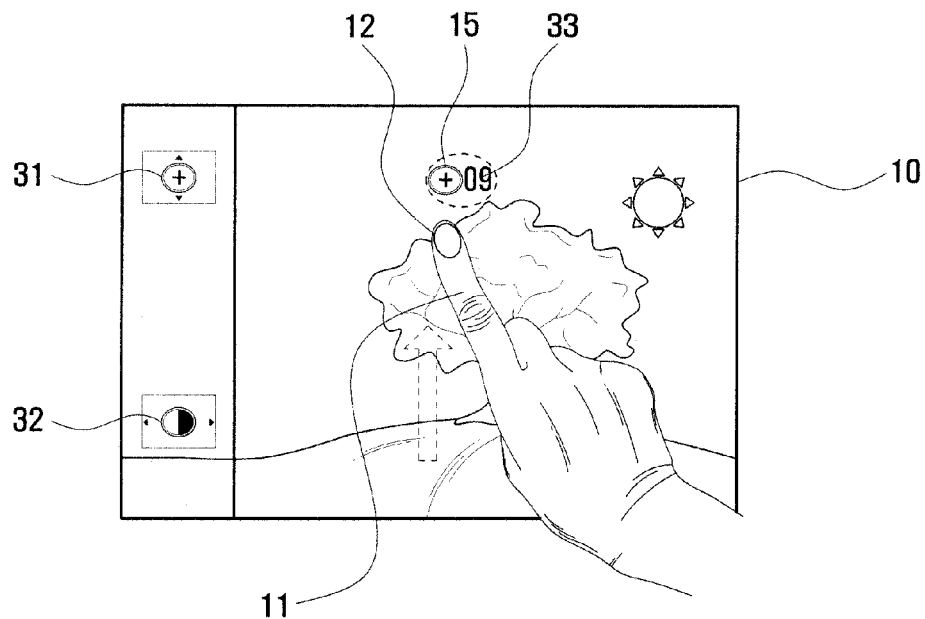

If the user drags the finger 11 upwards after touching the touch screen 10, as shown in FIG. 3C, the current mode icon 15 indicating a zoom in/out mode is displayed above the touch area 12, and a numerical value of the displacement value 33 indicating an extent of enlargement and reduction is displayed beside the current mode icon 15. In the zoom in/out mode, the shape of the current mode icon 15 may vary according to the movement direction of the touch area. For example, if the touch area 12 moves upwards, the shape of the current mode icon 15 may change to a symbol '+' indicating enlargement, and if the touch area 12 moves downwards, the shape of the current mode icon 15 may change to a symbol '−' indicating reduction.

As described above, the current mode is determined according to the movement direction of the touch area 12. The current mode is predetermined according to each movement direction, and the corresponding movement direction is displayed at an edge of the mode indication icons 31 and 32 located at the left side of the touch screen 10. The movement direction of the touch area 12 may be determined by identifying which of a vertical displacement and a horizontal displacement is greater. The displacement is represented as an absolute value regardless of an increasing rate or a decreasing rate of the displacement. In the case that the vertical displacement and the horizontal displacement have the same value at the beginning of movement, the current mode is not displayed when the touch area is first moved, but instead the current mode is determined and displayed at the completion of the touch movement.

The displacement value 33 displayed beside the current mode icon 15 has a function of indicating a maximum value and a minimum value. For example, while zooming in the touch screen 10 by moving the finger 11 upwards, as shown in FIG. 3C, if the displacement value 33 reaches the maximum value of zooming in, the color of the displacement value 33 changes to red to indicate that further enlargement of an image is not possible. When the maximum or minimum value is reached, the displacement value 33 does not change even if the touch area 12 moves further in the same movement direction.

Figure 3D:
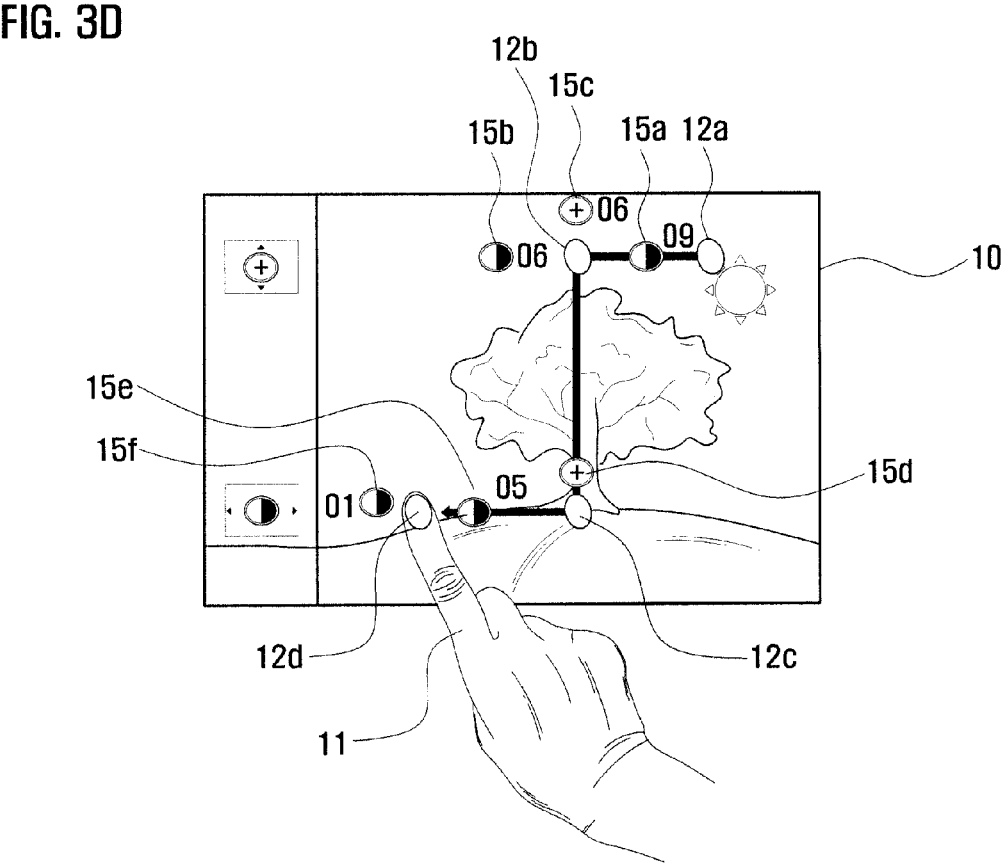

In an exemplary implementation, a plurality of functions in different modes may be executed by changing the movement direction of the finger 11 continuously, as shown in FIG. 3D. In the implementation, the finger 11 starts from a first touch area 12a and moves leftward to a second touch area 12b, then moves to a third touch area 12c, and finally moves leftward to a fourth touch area 12d.

As the finger 11 moves leftwards from the first touch area 12a to the second touch area 12b, brightness control mode icons 15a and 15b, respectively, are displayed as the current mode icon and the displacement value 33 indicating brightness is reduced from '09' to '06' respectively. When the movement direction of the finger 11 changes to the downward direction at the second touch area 12b, the brightness control mode icon 15b disappears and a zoom mode icon 15c appears. When moving from the second touch area 12b to the third touch area 12c, zoom mode icons 15c and 15d, respectively, showing the displacement value 33 are displayed, and the zoom mode icon 15d disappears when the movement direction of the finger 11 changes to the leftward direction at the third touch area 12c. When moving from the third touch area 12c to the fourth touch area 12d, brightness control mode icons 15e and 15f, respectively, showing the brightness are displayed.

Figure 4A:
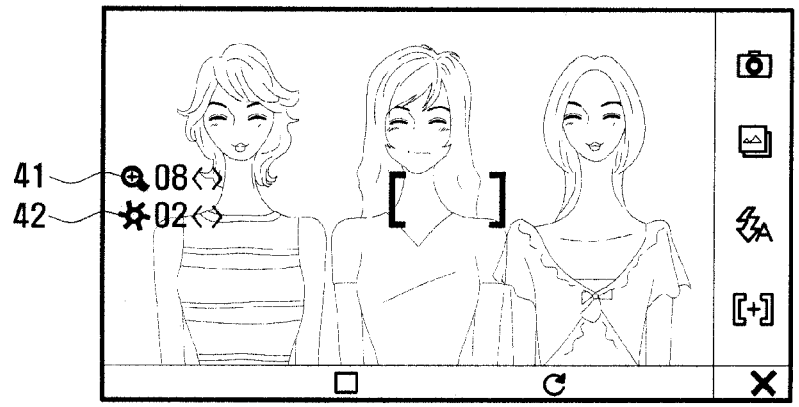
FIGS. 4A to 4C are display screens illustrating a method of displaying information according to an exemplary embodiment of the present invention.
Figure 4B:
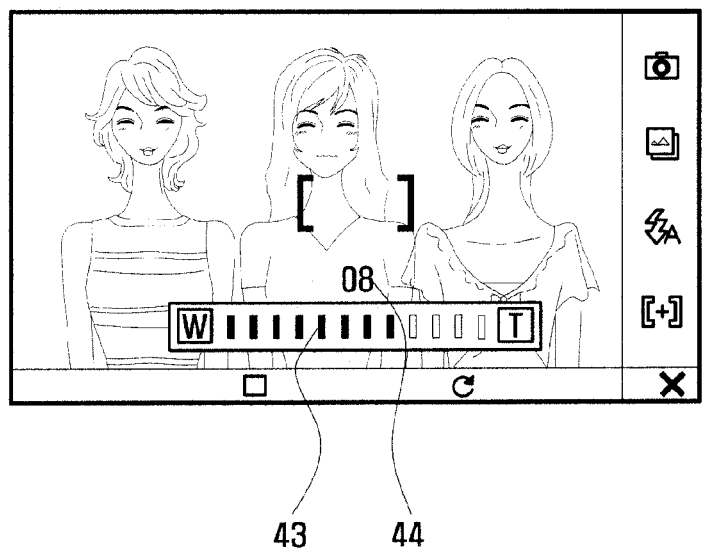
Figure 4C:
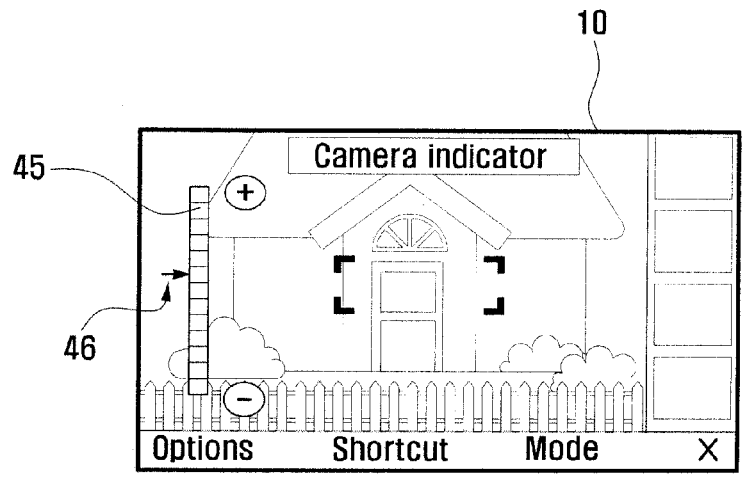

FIGS. 4A to 4C are display screens illustrating a method of displaying information according to an exemplary embodiment of the present invention. This exemplary embodiment corresponds to the second mode selection method. The difference between this exemplary embodiment and the previous exemplary embodiment of FIGS. 3A to 3D is that the displacement value is displayed differently, the current mode icon is not displayed, and the mode indication icon first appears and then disappears.

Referring to FIG. 4A, mode indication icons 41 and 42 are displayed at the left side of the touch screen 10. The mode indication icons 41 and 42 individually illustrate a mode assigned to a movement direction.

Referring to FIG. 4B, if the finger 11 touches the touch screen 10 and drags in a specific direction, the current mode is determined according to the movement direction of the finger 11. At this moment, no current mode icon is displayed, however a function of a selected mode is executed. A displacement value is determined according to the movement of the touch area 12 and displayed as a bar 43 and as numerals 44. The bar 43 has a shape extending in the movement direction of the finger 11. When the bar 43 and displacement value 44 appear, the mode indication icons 41 and 42 of FIG. 4A disappear from the touch screen 10.

FIG. 4C is another display screen illustrating an example of this exemplary embodiment. As shown in FIG. 4C, the displacement value 44 may be displayed as a bar 45 having a graduation indicator 46, and the bar 45 is disposed corresponding to the movement direction of the finger 11, as described above.

As shown in FIGS. 4B and 4C, the bars 43 and 45 may be displayed in different forms according to the displacement value. For example, the color and thickness of the bars may be set differently.

A current mode may be determined according to the movement direction of the finger 11 in the exemplary embodiment of FIGS. 4A to 4C, or according to the user's selection of a displayed mode indication icon in the exemplary embodiment of FIGS. 2A and 2B.

Hereinafter, a method of displaying information according to an exemplary embodiment of the present invention is described in relation to an internal operation of the mobile terminal.

The mobile terminal applied to the present invention may be a mobile phone, smart phone, Personal Digital Assistant (PDA), mobile broadcast receiver such as a Digital Multimedia Broadcasting (DMB) receiver, and multimedia player such as an MP3 player and a Portable Multimedia Player (PMP), but is not limited thereto. An exemplary implementation of the present invention may apply to any portable electronic device having a touch screen. The touch screen may be formed in the whole area of the mobile terminal or in a partial area at one side of the mobile terminal, and may further be formed at both sides of the mobile terminal. The mobile terminal may further include a keypad, a pointing device, and a side button, in addition to the touch screen.

Figure 5:
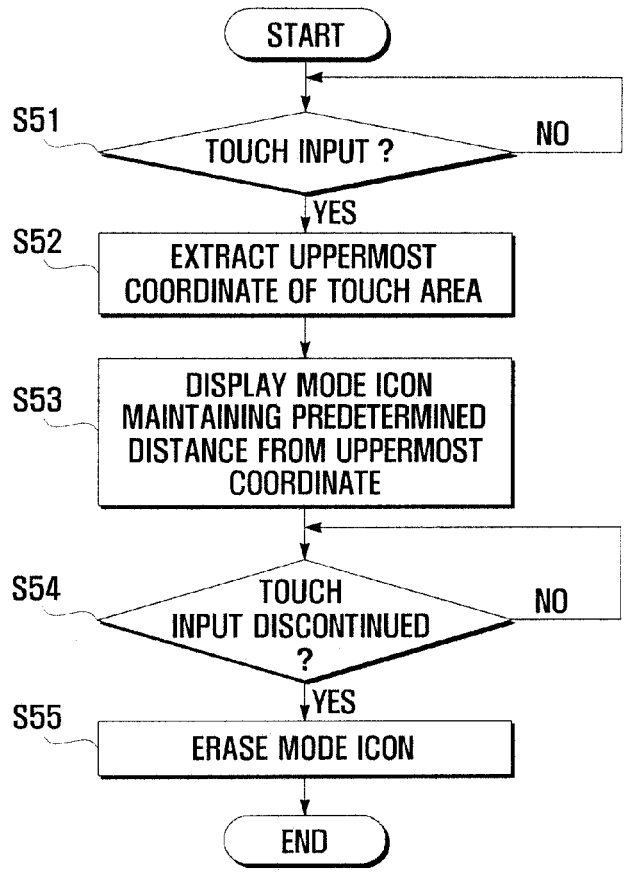
FIG. 5 is a flowchart illustrating a method of displaying information by using a touch screen input according to an exemplary embodiment of the present invention.

FIG. 5 is a flowchart illustrating a method of displaying information by using a touch screen input according to an exemplary embodiment of the present invention.

Referring to FIGS. 1A to 1C, and FIG. 5, a control unit of the mobile terminal determines whether a touch input is generated by a user through the touch screen 10 at step S51. A detecting unit of the touch screen 10 detects the touch input and outputs a signal of the touch input to the control unit. Coordinates of the touch area 12 are included in the signal of the touch input.

If a touch input is generated by a user, the control unit extracts an outermost coordinate from the coordinates of the touch area 12 at step S52. The outermost coordinate may be the uppermost coordinate 13 shown in FIG. 1A. Alternatively, a rightmost coordinate or a leftmost coordinate may be extracted instead of the uppermost coordinate 13, as shown in FIGS. 1B and 1C respectively. In this specification, one of the uppermost coordinate, the rightmost coordinate and the leftmost coordinate are used as the outermost coordinate, and extraction of the outermost coordinate is preset according to the user selection.

The control unit controls to display a current mode icon 15 above the uppermost coordinate 13 maintaining a distance 14 from the uppermost coordinate 13 at step S53. The current mode icon 15 is stored in a storage unit and is extracted from the storage unit by the control unit. If the outermost coordinate is extracted as the rightmost coordinate or the leftmost coordinate instead of the uppermost coordinate at step S52, the current mode icon 15 is displayed at the corresponding side of the touch area 12.

After displaying the current mode icon 15, the control unit determines whether the touch input is discontinued from the touch screen 10 at step S54. When the touch input is discontinued from the touch screen 10, the touch screen 10 terminates outputting of a signal to the control unit.

If the touch input is discontinued at step S54, the control unit erases the current mode icon 15 displayed in the touch screen 10 at step S55.

Figure 6:
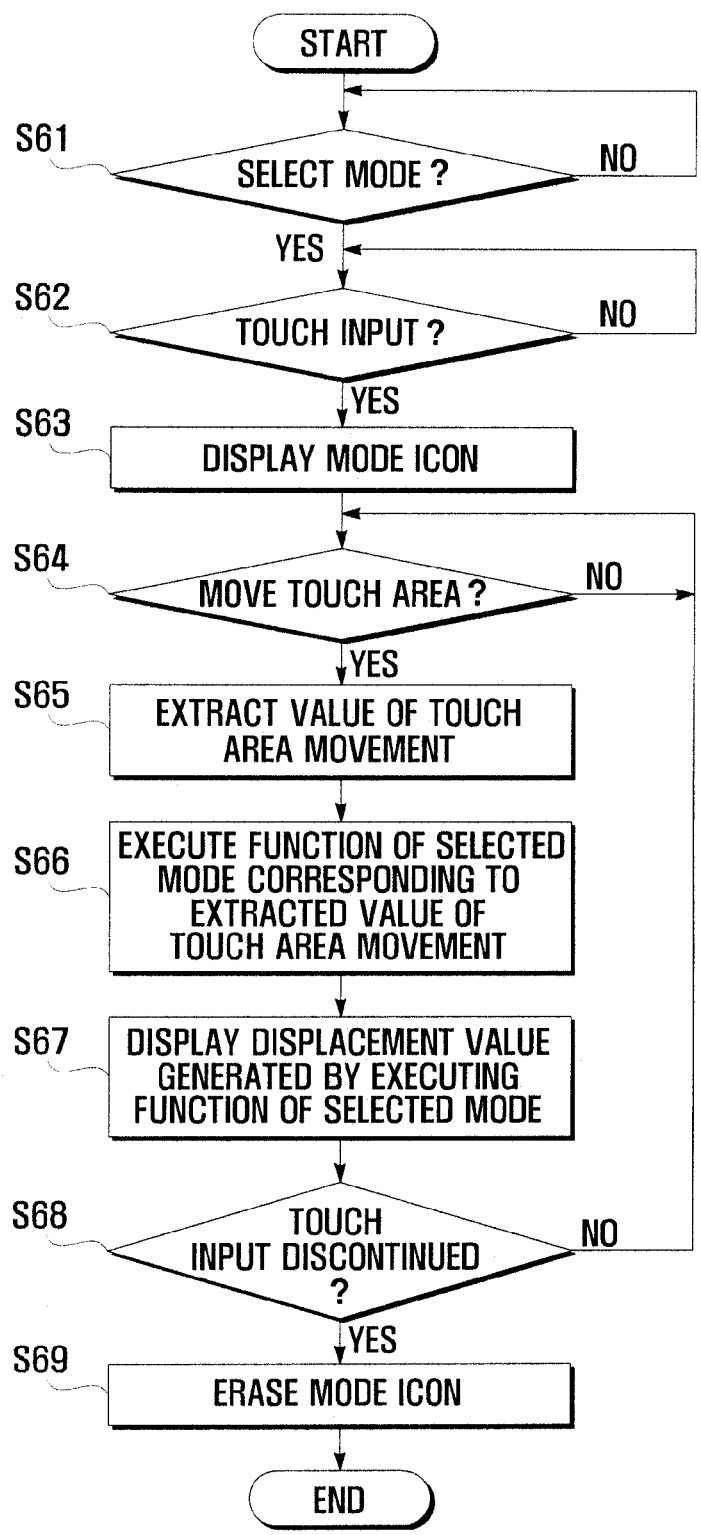
FIG. 6 is a flowchart illustrating a method of displaying information by using a touch screen input according to an exemplary embodiment of the present invention.

FIG. 6 is a flowchart illustrating a method of displaying information by using a touch screen input according to an exemplary embodiment of the present invention.

Referring to FIGS. 2A and 2B, and FIG. 6, the control unit of the mobile terminal determines whether a mode is selected from the touch screen 10 at step S61. In the touch screen 10, a plurality of mode indication icons (for example, 21 and 22) are displayed, and the detecting unit of the touch screen 10 detects a touch operation of at least one of the mode indication icons 21 and 22, and outputs a corresponding touch input signal to the control unit.

If a mode is selected, the control unit determines whether a further touch input signal is output by the touch screen 10 at step S62. The detecting unit of the touch screen 10 detects a touch operation in the touch screen 10 and outputs the touch input signal to the control unit. The coordinates of the touch area 12 are included in the touch input signal, and the control unit selects at least one of the uppermost, rightmost and leftmost coordinates of the touch area 12.

If a further touch input signal is output, the control unit controls to display a current mode icon 15 maintaining a distance from the extracted coordinate at step S63.

The control unit then determines whether the touch area 12 moves at step S64. If the user drags the finger 11 after touching the touch screen 10, the coordinates of the touch area 12 in the touch screen 10 changes accordingly, and thereby the control unit can detect the movement of the touch area 12.

If the touch area 12 moves, the control unit extracts a value of movement of the touch area 12 from the changes of the coordinates at step S65. The movement of the touch area 12 may be indicated in pixel units.

After extracting the movement of the touch area 12, the control unit executes a function of the current mode corresponding to the movement of the touch area 12 at step S66. Executing a function of the current mode may be predetermined according to the movement of the touch area 12. For example, if the current mode is a zoom in/out mode, the enlargement ratio of zooming may be set to y times corresponding to a movement of x pixels of the touch area 12 in the upward direction, according to a relationship between x and y, e.g. $y=mx$, where m is a constant.

While executing a function corresponding to the movement of the touch area 12, the control unit controls to display a displacement value corresponding to the execution of the function at step S67. For example, when the movement of the touch area is x pixels and the display screen is enlarged by y times, the value of y may be displayed in a numeral form.

Subsequently, the control unit determines whether the touch input is discontinued from the touch screen 10 at step S68. When the touch input is discontinued from the touch screen 10, the touch screen 10 no longer outputs a touch input signal to the control unit.

If the touch input generated by the touch screen 10 is discontinued at step S68, the control unit erases the current mode icon 15 displayed in the touch screen 10 at step S69.

Figure 7:
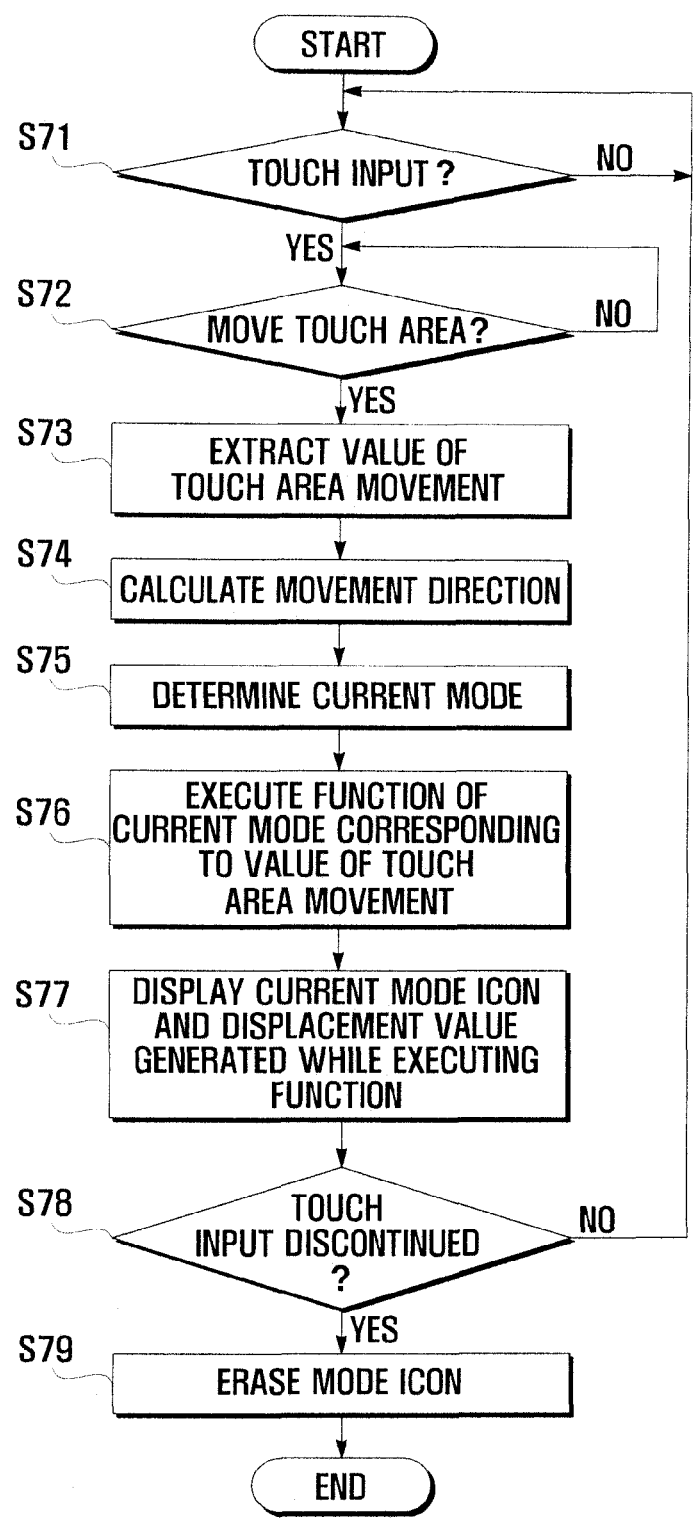
FIG. 7 is a flowchart illustrating a method of displaying information by using a touch screen input according to an exemplary embodiment of the present invention.

FIG. 7 is a flowchart illustrating a method of displaying information by using a touch screen input according to an exemplary embodiment of the present invention.

Referring to FIGS. 3A to 3D, and FIG. 7, the control unit of the mobile terminal determines whether a touch input signal is output by the touch screen 10 at step S71. The detecting unit of the touch screen 10 detects a touch operation in the touch screen 10 and outputs a touch input signal to the control unit. The coordinates of the touch area 12 are included in the touch input signal.

If a touch input signal is output, the control unit determines whether the touch area 12 moves at step S72. If the user drags the finger 11 after touching the touch screen 10, the coordinates of the touch area 12 transmitted from the touch screen 10 to the control unit change, and thereby the control unit can detect the movement of the touch area 12.

If the touch area 12 moves, the control unit extracts a value of movement of the touch area 12 from the changes of the coordinates of the touch area 12 at step S73. The movement of the touch area 12 may be indicated, for example, in pixel units, and the coordinates may be divided into an x-coordinate and a y-coordinate.

The control unit then calculates the movement direction of the touch area 12 from the extracted displacement of the touch area 12 at step S74. The movement direction is calculated by comparing each component of the movement in the horizontal direction and in the vertical direction, and by determining which component of the movement is greater.

The control unit determines a mode corresponding to the calculated movement direction as the current mode at step S75. A mode corresponding to each movement direction is predetermined. For example, a zoom in/out mode may be assigned to a vertical movement and a brightness control mode may be assigned to a horizontal movement.

The control unit executes a function of the current mode corresponding to a value of the movement extracted from the changes of the coordinates of the touch area 12 at step S76. The extent of executing a function of the current mode is set according to the movement.

While executing a function of the current mode corresponding to the displacement, the control unit displays a displacement value 33 and a current mode icon 15 at step S77.

The control unit determines whether the touch input generated by the touch screen 10 is discontinued at step S78. When the touch input generated by the touch screen 10 is discontinued, the touch screen 10 no longer outputs a touch input signal to the control unit.

If the touch input is discontinued at step S78, the control unit erases the current mode icon 15 displayed in the touch screen 10 at step S79.

As described above, the present invention provides a method of displaying information in a mobile terminal having a touch screen, in which a current mode is determined according to a touch input operation, and at least one of a displacement value generated by executing a function of the current mode and a mode icon indicating the current mode is displayed. Accordingly, when displaying information according to a touch input, changes of information may be displayed distinctively, and thereby user convenience may be improved.

Although exemplary embodiments of the present invention have been shown and described in detail hereinabove, it should be understood by those skilled in the art that various changes in form and details, many displacement values and modifications of the basic inventive concept herein described will still fall within the spirit and scope of the present invention as defined in the appended claims and their equivalents.

What is claimed is:

1. A method of displaying information in a mobile terminal, the method comprising:
    displaying a screen image in response to a function executed by a mobile terminal; and
    determining whether a touch input is generated by a touch screen;
    while the touch input is generated:
    determining whether a touch area moves;
    calculating, when the touch area is determined to move, a movement direction of the touch area by extracting a value of the touch area movement;
    determining a current mode according to the calculated movement direction of the touch area;
    executing, on the displayed screen image, a function of the current mode corresponding to the extracted value of the touch area movement, and changing the displayed screen image in accordance with the executed function; and
    displaying, while executing the function of the current mode, a displacement value representing an extent of the function executed according to the extracted value and a current mode icon indicating the current mode on the changing screen image.

2. The method of claim 1, wherein the current mode is set to a first mode if the calculated movement direction is a vertical direction and to a second mode if the calculated movement direction is a horizontal direction.

3. The method of claim 1, wherein the displacement value is displayed in a numeral form.

4. The method of claim 1, wherein the displacement value is displayed in a bar form.

5. The method of claim 4, wherein the bar form is disposed corresponding to the movement direction.

6. The method of claim 1, wherein the displaying of the displacement value and the current mode icon comprises:
    extracting an outermost coordinate from the coordinates of the touch area; and
    displaying the current mode icon maintaining a distance from the extracted outermost coordinate.

7. The method of claim 6, further comprising displaying the displacement value in a numeral form beside the current mode icon.

8. The method of claim 6, wherein the outermost coordinate comprises at least one of the uppermost coordinate, the leftmost coordinate and the rightmost coordinate of the touch area.

9. The method of claim 1, further comprising displaying, before determining whether the touch input is generated, mode indication icons of individual movement directions.

10. The method of claim 9, wherein the mode indication icons disappear when the displacement value is displayed.

11. The method of claim 1, further comprising:
    determining, after the displaying of the displacement value and the current mode icon, whether the touch input generated by the touch screen is discontinued; and
    erasing, if the touch input generated by the touch screen is discontinued, the current mode icon.

12. The method of claim 1, wherein the displaying of the displacement value and the current mode icon comprises:

displaying the displacement value and the current mode icon along the touch area movement.

* * * * *